United States Patent [19]

Sumachev

[11] 4,251,080
[45] Feb. 17, 1981

[54] TONE ARM

[76] Inventor: Jury N. Sumachev, Vasilievsky ostrov, 10 linia, 23, kv. 6, Leningrad, U.S.S.R.

[21] Appl. No.: 55,472
[22] Filed: Jul. 6, 1979

[30] Foreign Application Priority Data

Nov. 28, 1978 [SU] U.S.S.R. .............................. 2684251

[51] Int. Cl.³ .............................................. G11B 3/16
[52] U.S. Cl. .................................................. 369/248
[58] Field of Search ............................ 274/23 R, 23 A

[56] References Cited

U.S. PATENT DOCUMENTS

| 3,297,830 | 1/1967 | Baloghy | 274/23 R X |
| 3,836,155 | 9/1974 | Joannou | 274/23 R |
| 4,079,943 | 3/1978 | Morita et al. | 274/23 R |
| 4,154,445 | 5/1979 | Joannou | 274/23 R |

Primary Examiner—Charles E. Phillips
Attorney, Agent, or Firm—Holman & Stern

[57] ABSTRACT

A tone arm comprising a lever which has a pivoted axle mounted in an articulated joint and carries on one of its ends a pickup head. A viscous dynamic damping subassembly is designed to eliminate the main resonance frequency of the tone arm and includes a hollow casing rigidly affixed to the lever. The inner chamber of the casing is symmetrical relative to two mutually perpendicular axes and is filled to the fullest extent with a viscous fluid serving as a damping medium.

8 Claims, 3 Drawing Figures

TONE ARM

FIELD OF THE INVENTION

The invention relates to disc recording and reproduction and more particularly to tone arms.

The invention is suitable for use in electric sound reproducing systems of Hi-Fi variety.

DESCRIPTION OF THE PRIOR ART

The modern pickup is a mechanical resonance system comprised of a tone arm and a pickup head. It may be considered a mass which is connected with the disc grooves by virtue of the compliance of a movable pickup head system. Various disc defects such as rated or accidental warpage, off-centre condition, pressing faults, and technique faults result in sound distortions appearing at the tone arm resonance frequencies and characterized by wow and flutter, rumble and low-frequency overloads affecting the output amplifier. Moreover, the contact between the stylus and the disc is disturbed and the stylus sometimes wanders out of the groove-walls. The above-mentioned distortions considerably decrease the reproduction quality and cannot be eliminated by using conventional signal processing methods. To provide for more reliable contact between the stylus and the disc, the tracing force of the pickup may be increased. However, this is impractical in the case of Hi-Fi class equipment in which the tracing force is kept as small as possible. In top-quality models the friction in the tone arm pivots, even if small, causes definite resonance distortion which should always be avoided.

Damping the tone arm oscillations is the most effective way by which the above-mentioned distortions can be eliminated. At present, there exist a number of methods capable of damping oscillations at the tone arm main resonance frequency, such as dynamic resonance damping, viscous damping and dynamic viscous damping.

The simplest one of the above-mentioned methods of damping is carried out in a tone arm comprising a lever with a pivoted axle mounted in an articulated joint, one end of the lever carries a pickup head while the other end mounts a tone arm resonance viscous damping subassembly which is comprised of two concentric semi-spherical surfaces, one of said surfaces being coupled with the tone arm and the other, with the mount plate of an electric sound reproducing apparatus, a viscous fluid being introduced into the space between said surfaces. The subassembly makes it possible to damp the oscillations occuring at the main resonance frequency, but produces a mechanical resistance of unwanted value due to the forces of viscous friction, said resistance couteracting the movement of the pickup to the disc centre. Moreover, the lack of hermetic condition of the subassembly allows moisture and dust to get therein, with the result that the quality of the viscous fluid and, therefore, the damping property of the subassembly is deteriorated.

Know in the art is a viscous damping method (cf. Japanese Pat. No. 51-37521) carried out in a tone arm comprising a lever with a pivoted axle mounted in an articulated joint, one end of the lever carrying a pickup head, and a damping subassembly being fixed mechanically with the pivoted axle, said subsassembly being implemented in the form of a hermetically sealed cylindrical vessel. Mounted in the vessel is a magnet or a magnetic body which can be rotated freely about the pivoted axle, the space between the magnet and the vessel walls being filled with a viscous fluid. Mounted on the outside of the vessel is a magnet or a magnetic body. The damping subassembly is protected from moisture and dust, but the oscillations are damped in a single (vertical) plane only. To provide for damping the oscillations in a horizontal plane, it is possible to mount the same damping subassembly on the vertical rotatable axle of the tone arm, which results however, in a more sophisticated construction. In addition, the subassembly produces an additional mechanical resistance which counteracts the movement of the tone arm due to the forces of viscous friction.

There is a tone arm (model EPA-100 devised by Technics Denpakagoku and described in a leaflet No.9, p.220, 1978) in which the oscillations occurring in any plane can be damped. The tone arm comprises a lever with a pivoted axle mounted in an articulated joint, one end of the lever carrying a pickup head and the other carrying a counterweight which is a hermetically sealed cylindrical vessel accomodating a magnet and a damping magnetic body, the latter being arranged in a coaxial relation to the vessel and being coupled with its casing by virtue of a partial-pressure spring, the space surrounding the spring being filled with a viscous fluid. In this construction, a dynamic resonance damping method is employed which requires that the damper be adjusted precisely to the tone arm resonance frequency. This adjustment should be carried out during each replacement of the pickup head and the mass and compliance of the latter should be taken in consideration in this case. Therefore, such an adjustment can be carried out under laboratory conditions only.

Known in the art is a tone arm (cf. an article by Gary T. Nakai, entitled "Dynamic Damping of Stylus Compliance (Tone-Arm Resonance)", I.A.E.S., Sept., vol., 21, No.7, pp.555-562, 1973) comprising a lever with a pivoted axle mounted in an articulated joint, one end of the lever carrying a pickup head and a dynamic viscouse damping subassembly and the other carrying a counterweight. The damping subassembly comprises a hollow cylindrical casing surrounding a cylindrical damping body in a coaxial relation therewith, the space between the damping body and the casing walls being filled with a viscous fluid. The subassembly casing is rigidly coupled with the tone arm lever, while the damping body rigidly connects the pickup head. The construction is easy to operate; however, a horizontal position of the axis of the cylindrical damping body provides for a freedom of movement of the pickup head in a vertical direction only, with the result that the vertical oscillations of the tone arm can be subjected to dynamic viscous damping. In addition, jerks occurring during reproduction of recorded program cause the pickup head to rotate about the damper axis. This results in unwanted change of the vertical angle of replay and the tone arm construction thus does not provide for stable position of the pickup head relative to the disc plane.

In all the constructions mentioned above, the damping action depends on the ambient air temperature which is a critical parameter as related to viscous fluid.

SUMMARY OF THE INVENTION

An object of the invention is to provide a tone arm whose oscillations can be damped in any direction desirable.

Another object of the invention is to provide for the angles of replay associated with the tone arm.

Still another object of the invention is to provide for a smaller dependence of the damping action on the ambient air temperature.

There is provided a tone arm comprising a lever, which has a pivoted axle mounted in an articulated joint and carries on one of its ends a pickup head, and a viscous dynamic damping subassembly which is designed to eliminate the main resonance frequency of the tone arm, includes a hollow casing with a damping medium, and rigidly connects the lever, according to the invention, a fixed mechanical coupling is established between the hollow casing and the pickup head by virtue of the lever, an inner chamber of the casing being arranged in a symmetrical relationship to a pair of mutually perpendicular axes and filled to the fullest extent with a viscous fluid which is a damping medium.

To increase the damping action, the viscous fluid is a liquid elastomer.

To provide for the use of viscous fluid having a low viscosity, the inner chamber of the casing accomodates elastic radially extending partitions which partially span the inner chamber.

The tone arm of the invention is advantageous, as infrasonic oscillations propagating in any direction can be subjected to identical viscous dynamic damping, the desired replay angles can be obtained, the damping subassembly can be given adequate hermetic quality, the damping action depends on the ambient air temperature to a lesser extent, and higher operational reliability is attained.

DESCRIPTION OF THE DRAWINGS

The invention will now be described by way of example with reference to the accompanying drawings in which.

DESCRIPTION OF THE INVENTION

Figure 1:
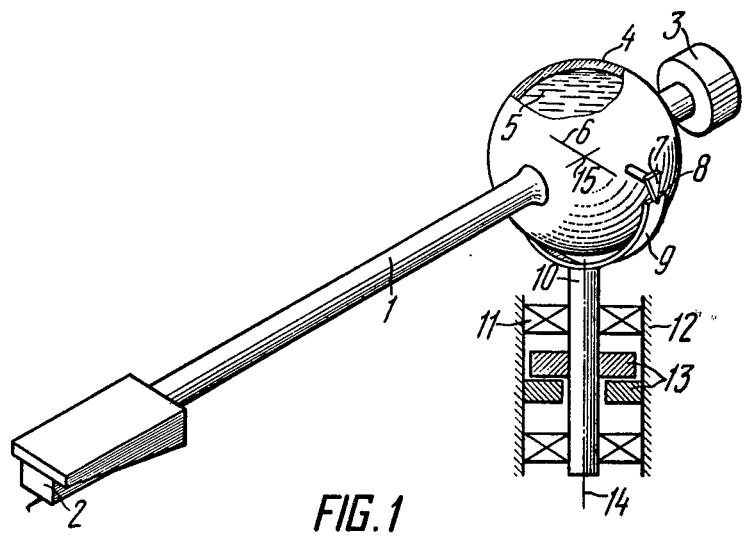
FIG. 1 is a general view of a tone arm with a viscous dynamic damping subassembly.

The tone arm of the invention comprises a lever 1 (FIG. 1) having one of its ends carrying a pickup head 2 and having the other end carrying a counterweight 3. A viscous dynamic damping subassembly designed to eliminate the main resonance frequency of the tone arm comprises a ball-shaped hollow casing 4 filled with a viscous fluid 5, for example, a liquid elastomer. The casing 4 is rigidly fixed to the lever 1 which provides for a fixed mechanical coupling between the casing 4 and the pickup head 2. A pivoted axle 6 of the lever 1 is mounted in an articulated joint provided by prism-type journals 7 which are rigidly connected to the casing 4 and rest on wedge-type cut-out portions 8 of a half-ring 9. The latter is rigidly connected to a vertical rotatable pivot 10 mounted in bearings 11 which sit in a base 12. To decrease the load applied to the bearings 11 they are separated by a magnetic support mounted in the base 12 and formed by permanent magnets 13 whose like poles face each other. The point 15 where the pivoted axle 6 intersects an axis 14 of the rotatable pivot 10 is the centre of revolution of the joint.

The viscous dynamic damping subassembly is so positioned that the centre of the inner chamber of the casing 4 coincides with the centre of revolution of the joint, with the result that the moment of inertia of the tone arm is decreased.

The viscous fluid 5 may glycerin or organosilicon liquids based on polymethyloxane or polymethylphenylsiloxane.

A liquid elastomer may be used as the viscous liquid 5, such as polyisobutylene or its gasoline solution.

Figure 2:
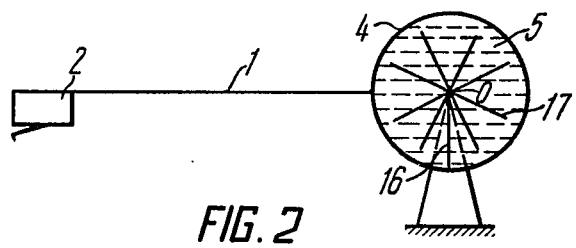
FIG. 2 is a tone arm with radially extending partitions each having its end affixed at the centre of the inner chamber of the casing.

FIG. 2 shows a tone arm whose inner chamber 4 filled with the viscous fluid 5 comprises a half-axle 16. There are radially extending elastic partitions 17 having a length somewhat less than the chamber radius and adapted to span partially the chamber, these partitions each having one of its ends fixed to the half-axle 16.

Figure 3:
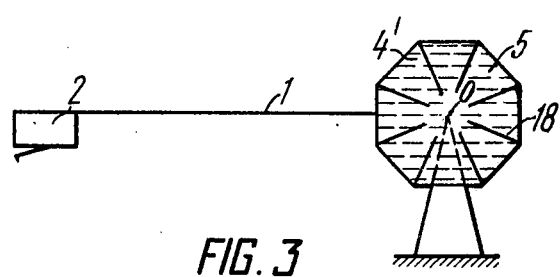
FIG. 3 is a tone arm with radially extending partitions each having its end affixed to the inner surface of the casing.

FIG. 3 shows a tone arm whose casing 4' is made in the form of a regular polyhedron. Elastic partitions 18, each having one of its ends affixed to the wall of the chamber of the casing 4', are directed to the centre 0 of the chamber and span it partially.

The partitions 17, 18 can be made of spring steel, bronze or plastic material with elastic properties.

The tone arm of FIG. 1 operates in the following manner. When the pickup head 2 receives the oscillations obtained from a warped or an off-centre disc (not shown), the casing 4, which is rigidly connected with the pickup head 2 via the lever 1, is subjected to angular oscillations. A torque produced by the force applied to the stylus of the pickup head 2 is transferred via the casing 4 to the viscous fluid 5 contained within the chamber of the casing 4 and possessing a certain moment of inertia. Due to the force of viscous friction, the external strata of the fluid 5 are moved together with the casing 4 and are also subjected to angular oscillations. The torque through the depth of the fluid 5 is transferred from one stratum to another and is decreased gradually, as each succeding stratum has a more weak coupling with the casing 4.

When a difference between the angular accelerations of the casing 4 and the strata of the fluid 5 takes place, the moment of the force produced by the moment of inertia of the mass of the fluid 5 and the moment of the force produced by viscous friction of the fluid 5 are opposing and tend to cancel each other out. The damping of the tone arm oscillations is effected at the moment when a portion of the kinetic energy of the oscillations is transformed into the kinetic energy responsible for the relative movement of the casing 4 and the fluid 5 and is also transformed in thermal energy due to internal friction of the fluid 5.

In the case of uniform movement of the pickup head 2 during reproduction, the casing 4 is rotated about its centre 15 with a constant angular speed and the fluid 5 within the casing 4 is moved together with it. The relative movement of fluid 5 does not occur, as the casing 4 is not accelerated and the damper absorbs no energy in this case. The work required for the movement of the pickup head 2 is used to counteract the moment of the force developed by the unwanted friction in the bearings 13 of the tone arm joint.

The resonance frequency f and the quality Q of the oscillation system of the pickup utilizing the viscous dynamic damper of the invention is determined by $$f = \frac{1}{2\tau_1 \tau C} \cdot \frac{m_2}{m_1 + m_2} \quad (1)$$

$$Q = 1 + \frac{2m_1}{m_2} \quad (2)$$

where
r is the mechanical resistance of the viscous fluid;
C is the compliance of the pickup head;
$m_1 = I_1/l^2$ is the active mass of the tone arm (the fluid not included);
$m_2 = I_2/l^2$ s the active mass of the viscous fluid;
$I_1$ is the moment of inertia of the tone arm (without the fluid):
$I_2$ is the moment of inertia of the viscous fluid;
l is the mount base of the tone arm, as measured from the centre of revolution of the system to the tip of the stylus.

The moment of inertia $I_2$ for a fluid contained in a spherical casing is determined by $$I_2 = \frac{2M_2 \cdot R^2}{5} \quad (3)$$

where
$M_2$ is the mass of the fluid; and
R is the radius of the spherical casing.

$$M_2 = \frac{4}{3} \tau_1 R^3 \rho_2 \quad (4)$$

where $\rho_2$ is the density of the fluid.
This gives $$m_2 = \frac{8}{15} \cdot \frac{\tau_1 R^5 \rho_2}{l^2} \quad (5)$$

and $$R = \sqrt[5]{\frac{15 m_2 l^2}{8 \tau_1 \rho_2}} \quad (6)$$

The optimum value of the mechanical resistance of the viscous fluid, $r_{opt}$, under adequate damping conditions is determined by $$r_{opt} = 2 \sqrt{\frac{m_1}{C} \cdot \frac{Q}{(Q^2 - 1)(Q + 1)}} \quad (7)$$

The mechanical resistance of the fluid is determined by $$\eta = \frac{8}{3} \tau_1 \cdot \eta \cdot \frac{R^3}{l^2} \quad (8)$$

where $\rho$ is the viscosity of the liquid.
Using (7) and (8), the optimum value of the viscosity of fluid, $\rho$ is determined by $$\eta = \frac{3 r_{opt} l^2}{8 \tau_1 R^3} \quad (9)$$

Knowing the value of Q, the active mass $m_1$ of the pickup head and the compliance C of the pickup head, one can determine the radius R of the sperical chamber and the viscosity of the fluid at a given density $\rho_2$.

When the viscous fluid 5 is a liquid elastomer, a portion of the kinetic energy of the oscillations of the casing 4 is transformed to the potential energy of the elastic component of the elastomer, said potential energy, with a decrease in the difference between the angular accelerations of the casing 4 and the elastomer, is transformed to thermal energy due to the presence of forces of internal friction.

When additional elastic partitions 17 (FIG. 2) or 18 (FIG. 3) are installed in the inner chamber of the casing 4 (4') filled with the viscous fluid 5, a greater cohesion surface is thus provided and, therefore, more intense coupling between the casing 4(4') and the fluid 5. In addition, use is made of the effect of an additional resonance damping, whose maximal magnitude is attained when the frequency of the basic resonance of the tone arm coincides with the frequency of the intrinsic oscillations of the damper, which coincidence is determined by the moment of inertia of the fluid and by the flexibility of the partitions, the mechanical resistance of the fluid being taken into consideration. When a difference between the angular accelerations of the casing 4 and the fluid 5 takes place, the moment of the force produced by the moment of inertia of the mass of the fluid 5 tends to bend the partitions 17, 18, with the result that a portion of the kinetic energy is transformed to the potential energy of the partitions 17, 18. The degree of damping the tone arm is increased due to the transformation of the potential energy of the partitions 17, 18 to thermal energy when they are brought to the intial position. In this case, the viscous fluid may have a lower viscosity, since the mechanical resistance, according to (2) is maintained constant due to an increase in the cohesion surface.

The casing 4 may be a hollow sphere (FIGS. 1, 2) or a polyhedron, either regular (octahedron in FIG. 3) or nonregular (for example, a cube having its faces each mounting a regular prism). A polyhedron must be symmetrical relative to two mutually perpendicular axes, namely, a horizontal and a vertical one, which are located in the planes where forced oscillations of the tone arm take place.

The tone arm of the invention provides for viscous dynamic damping of the forced oscillations of the pickup head 2 propagating in any direction, since the mass of the fluid 5 contained in the casing 4, which is symmetrical relative to two mutually perpendicular axes, has three degrees of freedom. In addition, the damping action depends to a lesser extent on the ambient air temperature. When the temperature is increased and the viscosity of the fluid 5 is therefore decreased, that portion of the fluid 5 which is held immovable is increased, with the result that the value of the frequency f and Q vary a little. The value of the active mass $m_2$ undergoes small variation with a decrease in the temperature, since increasing cohesion forces results in a decrease in the immovable portion of the fluid 5.

According to FIG. 1, a prototype of the tone arm of the invention has been manufactured which has the following specification:

|  |  |
|---|---|
| tone arm mount base | 0.23 m |
| radius of spherical casing of damper | 0.048 m |
| viscous fluid | glycerin |
| mass of viscous fluid | 0.5 kg |
| tone arm main resonance frequency | 8 Hz |
| resonance quality | 2.5 |
| ambient air temperature variation | 10 to 40° C. |

The prototype was tested in conjunction with an electric reproducing system of Hi-Fi class. The noise in the resonance range was decreased by 10 to 12 dB. A considerable decrease of pickup noise was attained in tracing warped or off-centre discs. The rumble resulted from the vibration of the drive mechanism was decreased too. The prototype was operated reliably when the ambient air temperature varied within the prescribed range.

What is claimed is:

1. A tone arm comprising:
a lever having two ends: a pivoted axle of said lever; an articulated joint mounting said pivoted axle so that the latter passes through the center of revolution of the joint; a pickup head rigidly fixed on one of said ends of said lever; a hermetically sealed hollow casing rigidly coupled with said lever; an inner chamber of said casing, which is symmetrical with two mutually perpendicular axes intersecting at said center of revolution; a viscous fluid filling said inner chamber to the fullest extent and adapted to function as a damping medium; said casing together with said viscous fluid constituting a viscous dynamic damping subassembly intended to eliminate the tone arm main resonance frequency.

2. A tone arm as claimed in claim 1, wherein said viscous fluid is a liquid elastomer.

3. A tone arm as claimed in claims 1 or 2, wherein said inner chamber is filled only with said viscous fluid and is devoid of all other structure.

4. A tone arm as claimed in claim 1, further comprising elastic radially extending partitions mounted for movement with said housing and which partially span the inner chamber.

5. The tone arm according to claim 4, wherein said chamber is defined by a peripheral wall and wherein said partitions are secured to said wall and extend radially inward of said chamber.

6. The tone arm according to claim 4, wherein said chamber is defined by a peripheral wall and further comprising axle means securing said partitions to said wall.

7. A tone arm assembly comprising:
a lever having two ends and a pivot axis;
articulated joint means, having a center of revolution, for mounting said lever such that said pivot axis passes through said center of revolution;
a pickup head rigidly fixed on one of said ends of said lever; and
viscous dynamic damping means for eliminating main frequency resonance in said tone arm, said viscous dynamic damping means comprising:
a hermetically sealed hollow casing rigidly coupled to said lever, said casing having an inner chamber disposed symmetrically with respect to two mutually perpendicular axes intersecting at said center of revolution; and
a viscous fluid, filing said inner chamber to the fullest extent, for damping oscillatory movement of said casing.

8. The tone arm assembly according to claim 7, further comprising elastic partition means secured to said casing and extending radially within said inner chamber for increasing the damping effect of said damping means.

* * * * *